(12) United States Patent
Seong

(10) Patent No.: US 10,726,691 B2
(45) Date of Patent: Jul. 28, 2020

(54) COMMUNICATION MODULE AND WIRELESS SECURITY CAMERA SYSTEM USING SAME

(71) Applicant: EMW CO., LTD., Incheon (KR)

(72) Inventor: Won Mo Seong, Gyeonggi-do (KR)

(73) Assignee: EMW CO., LTD., Incheon (KR)

( * ) Notice: Subject to any disclaimer, the term of this patent is extended or adjusted under 35 U.S.C. 154(b) by 109 days.

(21) Appl. No.: 15/766,610

(22) PCT Filed: Oct. 5, 2016

(86) PCT No.: PCT/KR2016/011132
§ 371 (c)(1),
(2) Date: Apr. 6, 2018

(87) PCT Pub. No.: WO2017/061763
PCT Pub. Date: Apr. 13, 2017

(65) Prior Publication Data
US 2018/0301007 A1    Oct. 18, 2018

(30) Foreign Application Priority Data

Oct. 6, 2015 (KR) ........................ 10-2015-0140321

(51) Int. Cl.
*G08B 13/196* (2006.01)
*H04N 7/18* (2006.01)
(Continued)

(52) U.S. Cl.
CPC ....... *G08B 13/1966* (2013.01); *H04B 7/0413* (2013.01); *H04B 7/0617* (2013.01); *H04N 7/12* (2013.01); *H04N 7/18* (2013.01)

(58) Field of Classification Search
CPC .............. G08B 13/1966; H04B 7/0413; H04B 7/0617; H04N 7/12; H04N 7/18
See application file for complete search history.

(56) References Cited

U.S. PATENT DOCUMENTS

| | | | |
|---|---|---|---|
| 2008/0086749 A1 | 4/2008 | Goldberg et al. | |
| 2008/0181252 A1* | 7/2008 | Rofougaran | H04L 12/40013 370/451 |

(Continued)

FOREIGN PATENT DOCUMENTS

| | | |
|---|---|---|
| JP | 2005-110130 A | 4/2005 |
| JP | 2007-089090 A | 4/2007 |

(Continued)

OTHER PUBLICATIONS

International Search Report for PCT/KR2016/011132.

*Primary Examiner* — Mishawn N. Hunter
(74) *Attorney, Agent, or Firm* — The PL Law Group, PLLC

(57) ABSTRACT

A wireless security camera system includes a security camera, a first communication module which receives, from the security camera, images captured by the security camera, and includes antennas for transmitting, through a wireless network, the captured images received, a second communication module including antennas for receiving the captured image to be transmitted through the antennas, and a storage unit for storing the captured image received by the second communication module, wherein the captured images are transmitted and received between the plurality of antennas of the first communication module and the plurality of antennas of the second communication module in a multi-input, multi-output (MIMO) manner, and the first communication module and the second communication module perform beamforming to the plurality of antennas toward the direction of the other party when transmitting the captured images to transmit and receive.

13 Claims, 3 Drawing Sheets

(51) Int. Cl.
   *H04B 7/06*      (2006.01)
   *H04B 7/0413*    (2017.01)
   *H04N 7/12*      (2006.01)

(56) References Cited

U.S. PATENT DOCUMENTS

| | | |
|---|---|---|
| 2011/0075644 A1 | 3/2011 | Feder et al. |
| 2013/0201316 A1* | 8/2013 | Binder .................... H04L 67/12 |
| | | 348/77 |

FOREIGN PATENT DOCUMENTS

| | | |
|---|---|---|
| JP | 2009-141547 A | 6/2009 |
| JP | 2009-171317 A | 7/2009 |
| JP | 2010-124259 A | 6/2010 |
| JP | 2014-082637 A | 5/2014 |
| JP | 2014-195238 A | 10/2014 |
| KR | 10-2007-0038784 A | 4/2007 |
| KR | 10-0874784 B1 | 12/2008 |
| KR | 10-2009-0032800 A | 4/2009 |
| KR | 10-1471060 B1 | 12/2014 |
| KR | 10-2015-0107809 A | 9/2015 |

* cited by examiner

COMMUNICATION MODULE AND WIRELESS SECURITY CAMERA SYSTEM USING SAME

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2016/011132, filed Oct. 5, 2016, which claims priority to the benefit of Korean Patent Application No. 10-2015-0140321 filed in the Korean Intellectual Property Office on Oct. 6, 2015, the entire contents of which are incorporated herein by reference.

TECHNICAL FIELD

The present invention relates to a data transmission technique, and more particularly, to a technique for wirelessly transmitting a captured image of a security camera.

BACKGROUND ART

Recently, the installation of security cameras is increasing due to crime prevention, monitoring, information gathering, or the like. Conventionally, captured images of a security camera are transmitted via a wired network. However, due to difficulties in wiring and an increase in installation cost, attempts have been made to transmit captured images via a wireless communication network such as Wi-Fi or Long-Term Evolution (LTE).

However, in the case of conventional Wi-Fi, which is a wireless transmission method based on single-input and single-output (SISO), data transmission is interrupted due to multi-pass fading according to delay (time delayed reflected wave) of a received signal caused by a surrounding environment such as an obstacle. When a data transmission rate is lowered due to various wireless communication environment variables, the degradation of a high-quality image occurs because a method of increasing data compression rate is used.

Further, although a high-output patch antenna is used for long distance transmission, the mounting cost is increased, and positions and directivity of transmission and reception antennas should be considered, and thus there is difficulty in installation. An antenna having a high gain such as a patch antenna is applied only to outdoor standards, and thus the antenna cannot be used in an indoor long-distance transmission.

Meanwhile, in the case of LTE, there is a restriction for service to be provided through a designated network service provider, the system construction cost for the related service is high, and the service user has to pay an LTE data fee. Therefore, LTE is a wireless image transmission method that is a heavy burden for both the operators and the consumers.

SUMMARY

Embodiments of the present invention are directed to providing a communication module capable of ensuring the continuity of monitoring by improving a data transmission rate when a captured image of a security camera is transmitted, and a wireless security camera system using the same.

Embodiments of the present invention are directed to providing a communication module capable of transmitting a captured image of a security camera outdoors and indoors over a long distance, and a wireless security camera system using the same.

One aspect of the present invention provides a wireless security camera system, which is a system for wirelessly transmitting images captured by a security camera. The wireless security camera system includes a security camera, a first communication module configured to receive images captured by the security camera from the security camera and including a plurality of antennas configured to transmit the received captured images via a wireless network, a second communication module including a plurality of antennas configured to receive the captured images transmitted through the plurality of antennas; and a storage unit configured to store the captured images received by the second communication module, wherein the captured images are transmitted and received between the plurality of antennas of the first communication module and the plurality of antennas of the second communication module in a multi-input and multi-output (MIMO) manner, and the first communication module and the second communication module transmit and receive the captured images by performing beamforming on the plurality of antennas in a direction of the other module when transmitting the captured images.

The first communication module and the second communication module may transmit and receive the captured images of the security camera using an Institute of Electrical and Electronics Engineers (IEEE) 802.11ac standard.

The first communication module and the second communication module may transmit and receive the captured images of the security camera using an N×N MIMO manner (N is a natural number) with a frequency bandwidth of 80 MHz at a frequency of 5 GHz.

The first communication module and the second communication module may be communicatively connected to each other by performing pairing, confirm the direction of the other module, and may change phases of beam patterns of the plurality of antennas such that a direction in which points at which the beam patterns overlap are connected is directed to the direction of the other module.

The first communication module may be built in the security camera, and provided in a manner that the security camera directly transmits the captured images by MIMO and beamforming.

The second communication module may be built in the storage unit.

The first communication module may include an interface connected to the security camera and configured to receive images captured by the security camera, a modulator configured to modulate the captured images received by the interface and generate a plurality of subcarriers, a plurality of first radio frequency (RF) chains configured to amplify the modulated subcarriers, a plurality of first antennas respectively connected to the plurality of first RF chains and configured to transmit the subcarriers, and a beamforming controller configured to transmit the modulated subcarriers to the plurality of first RF chains and perform beamforming on the plurality of first antennas.

The second communication module may include a plurality of second antennas configured to receive the subcarriers transmitted by the plurality of first antennas, a plurality of second RF chains respectively connected to the plurality of second antennas and configured to filter the received subcarriers, a demodulator configured to receive the subcarriers from the plurality of second RF chains and demodulate the subcarriers to the captured images, and an interface connected to the storage unit and configured to transmit the demodulated captured images to the storage unit.

Another aspect of the present invention provides a communication module, which is a communication module for wirelessly transmitting images captured by a security camera. The communication module includes an interface connected to the security camera and configured to receive images captured by the security camera, a modulator configured to modulate the captured images received by the interface and generate a plurality of subcarriers, a plurality of RF chains configured to amplify the modulated subcarriers, a plurality of antennas respectively connected to the plurality of RF chains and configured to transmit the subcarriers to another communication module in a multi-input and multi-output (MIMO) manner, and a beamforming controller configured to transmit the modulated subcarriers to the plurality of RF chains and perform beamforming on the plurality of antennas in a direction of the another communication module when the respective subcarriers are transmitted.

The communication module may transmit the captured images of the security camera to another communication module using an Institute of Electrical and Electronics Engineers (IEEE) 802.11ac standard.

The communication module may transmit the captured images of the security camera to another communication module using an N×N MIMO manner (N is a natural number) with a frequency bandwidth of 80 MHz at a frequency of 5 GHz.

The beamforming controller may confirm the direction of another communication module by performing a pairing with another communication module, and change phases of beam patterns of the plurality of antennas such that a direction in which points at which the beam patterns are intersected are connected is directed to the direction of another communication module.

The communication module may be built in the security camera, and provided in a manner that the security camera directly transmits the captured images by MIMO and beamforming.

The RF chains may receive a transmission switching control signal or a reception switching control signal from the beamforming controller of the communication module, and amplify the modulated subcarriers and transmit the amplified modulated subcarriers through the antennas when receiving the transmission switching control signal from the beamforming controller.

The RF chains may receive a transmission switching control signal or a reception switching control signal from the beamforming controller of the communication module, and filter radio waves received through the antennas and transmit the filtered radio waves to the beamforming controller when receiving the reception switching control signal from the beamforming controller.

According to embodiments of the present invention, an image captured by a security camera is transmitted using an Institute of Electrical and Electronics Engineers (IEEE) 802.11ac standard, and thus the captured image can be transmitted in a high frequency bandwidth of 80 MHz at a frequency of 5 GHz, thereby enabling high-speed data transmission. Specifically, it is possible to realize a transmission rate of data (a data throughput) of 1 Gbps or more by transmitting the captured image through a multi-input and multi-output (MIMO) system. In this case, not only a full high definition (FHD) image but also an ultra-high definition (UHD) image can be transmitted in real time, and captured images of a plurality of security cameras can be simultaneously transmitted using one communication module.

Further, the captured image is transmitted by an MIMO function using the IEEE 802.11ac standard, and thus when the captured image of the security camera is transmitted, a delayed signal due to multi-pass fading can be detected and corrected and an image disconnection phenomenon due to information loss can be improved, thereby ensuring the continuity of monitoring through the security camera.

Further, the image captured by the security camera is transmitted by forming high-output beam patterns between a transmission device and a reception device using a beamforming method, and thus a data transmission distance can be lengthened, thereby enabling the long-distance transmission of the captured image. Here, a communication module is integrated with the security camera and directly transmits the image captured by the security camera through beamforming, and thus the long-distance transmission of the captured image can be performed without a separate relay device. Further, according to the embodiments of the present invention, the captured image of the security camera may be transmitted outdoors and indoors over a long distance.

DETAILED DESCRIPTION

Hereinafter, exemplary embodiments of the present invention will be described in detail with reference to the accompanying drawings. The following detailed description is provided to help comprehensive understanding of methods, devices and/or systems described in this specification. However, these embodiments are only examples and the present invention is not limited thereto.

When embodiments of the present invention are described, if it is determined that detailed descriptions of known technology related to the present invention unnecessarily obscure the subject matter of the invention, detailed descriptions thereof will be omitted. Some terms described below are defined by considering functions in the invention and meanings may vary depending on, for example, a user or operator's intentions or customs. Therefore, the meanings of terms should be interpreted based on the scope throughout this specification. The terminology used in the following detailed description is only provided to describe embodiments of the present invention and not for purposes of limitation. Unless the context clearly indicates otherwise, the singular forms include the plural forms. It will be understood that the terms "comprises" or "includes" when used herein, specify some features, numbers, steps, operations, elements, and parts or combinations thereof, but do not preclude the presence or possibility of one or more other features, numbers, steps, operations, elements, and parts or combinations thereof in addition to the description.

In the following description, terms such as "transfer," "communication," "transmission," and "reception" of a signal or information and other similar terms refer to a signal or information which is directly transmitted from one element to another element and a signal or information which is transmitted from one element to another element via yet another element. Specifically, the transfer or transmission of a signal or information to one element indicates a final destination of the signal or information and does not indicate a direct destination of the signal or information. This is the same in the "reception" of the signal or information. Further, in this specification, the fact that two or more pieces of data or information are related means that when one piece of data (or information) is obtained, at least a part of other data (or information) may be obtained on the basis of the obtained data (or information).

Further, it will be understood that, although the terms "first," "second," etc. may be used herein to describe various elements, these elements should not be limited by these terms. These terms may only be used to distinguish one element from another. For example, a first element could be termed a second element, and, similarly, a second element could be termed a first element, without departing from the scope of the present invention.

Figure 1:
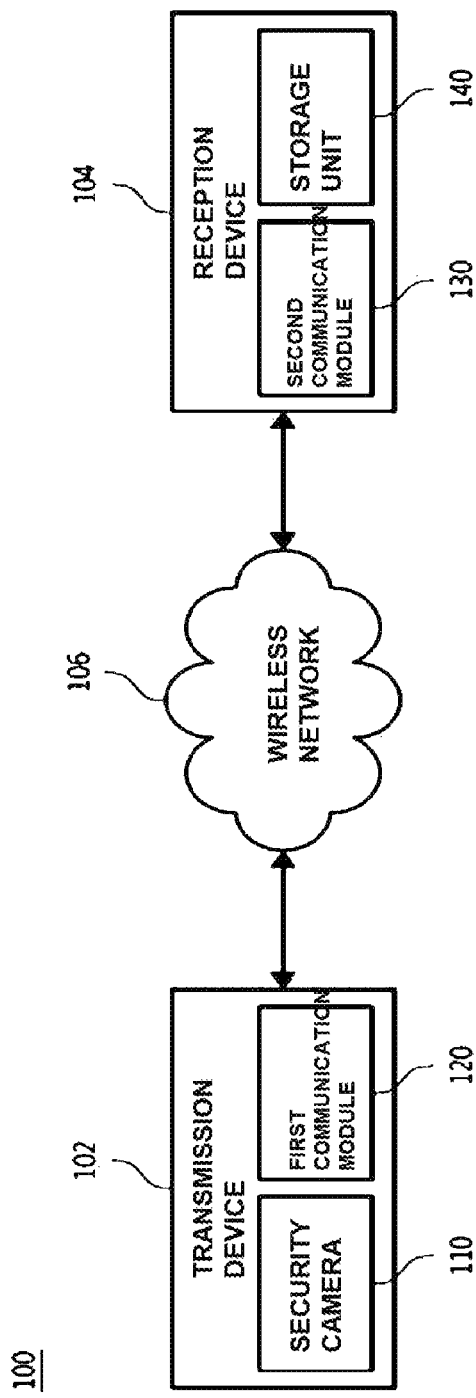
FIG. 1 is a block diagram showing a configuration of a wireless security camera system according to an embodiment of the present invention.

FIG. 1 is a block diagram showing a configuration of a wireless security camera system according to an embodiment of the present invention.

Referring to FIG. 1, a wireless security camera system 100 includes a transmission device 102 and a reception device 104. The transmission device 102 and the reception device 104 are communicatively connected via a wireless network 106. The wireless network 106 may be, for example, a wireless local area network (WLAN), Wi-Fi, a mobile communication network, ZigBee, Bluetooth, or the like. Preferably, an Institute of Electrical and Electronics Engineers (IEEE) 802.11ac standard of Wi-Fi may be used for the wireless network 106.

The transmission device 102 may include a security camera 110 and a first communication module 120. The security camera 110 may capture an area around the security camera 110. The security camera 110 may be installed at a predetermined place (outdoors or indoors) for monitoring a corresponding area. The security camera 110 may be provided with a pan/tilt adjustable so as to secure a capturing angle and a capturing field of view. The security camera 110 may be referred to as an Internet protocol (IP) camera, a closed-circuit television (CCTV) camera, or the like. The security camera 110 may transmit a captured image to the first communication module 120. In this case, the security camera 110 may compress the captured image and transmit the compressed image to the first communication module 120. In an exemplary embodiment, the security camera 110 and the first communication module 120 may be communicatively connected via a local area network (LAN) such as Ethernet or the like.

The first communication module 120 serves to transmit an image captured by the security camera 110 to the reception device 104 via the wireless network 106. In an exemplary embodiment, the first communication module 120 may transmit the captured image to the reception device 104 using an IEEE 802.11ac standard.

The first communication module 120 has a multi-input and multi-output (MIMO) function for increasing a transmission rate or a transmission amount of captured image data. The first communication module 120 includes a plurality of antennas for the MIMO function. Further, the first communication module 120 has a beamforming function for transmitting the captured image data over a long distance.

The first communication module 120 may be integrated with the security camera 110. For example, the first communication module 120 may be built in the security camera 110. That is, the first communication module 120 may be built in the wireless security camera system 100.

The reception device 104 may include a second communication module 120 and a storage unit 140. The second communication module 120 may receive the captured image transmitted from the first communication module 120. In an exemplary to embodiment, the second communication module 120 may receive the captured image transmitted from the first communication module 120 using an IEEE 802.11ac standard. As described above, when the first communication module 120 and the second communication module 120 communicate with each other using the IEEE 802.11ac standard, a high bandwidth of 80 MHz at a frequency of 5 GHz may be used, and data may be transmitted at a rate of up to 1.7 Gbps based on 4×4 MIMO.

The second communication module 120 may bidirectionally communicate with the first communication module 120. That is, the second communication module 120 may receive a captured image from the first communication module 120 and transmit data or a control signal to the first communication module 120. To this end, the second communication module 120 also has an MIMO function and a beamforming function. That is, when the second communication module 120 transmits data or a control signal to the first communication module 120, the second communication module 120 transmits the data or the control signal using the MIMO function and the beamforming function. Here, the second communication module 120 may be integrated with the storage unit 140. For example, the second communication module 120 may be built in the storage unit 140.

The storage unit 140 stores the captured image received by the second communication module 120. The storage unit 140 may be, for example, a network video recorder (NVR), a digital video recorder (DVR), or the like, but the present invention is not limited thereto. The storage unit 140 may include local storage such as a Direct Attached Storage (DAS), network storage such as a Network Attached Storage (NAS) or a Storage Area Network (SAN), a cloud storage, and other various types of storage. The storage unit 140 may be connected to a display device (e.g., a smart TV, a notebook PC, a computer, a tablet PC, a smart phone, or the like). In this case, the captured image stored in the storage unit 140 may be viewed through a screen of the display device.

Figure 2:
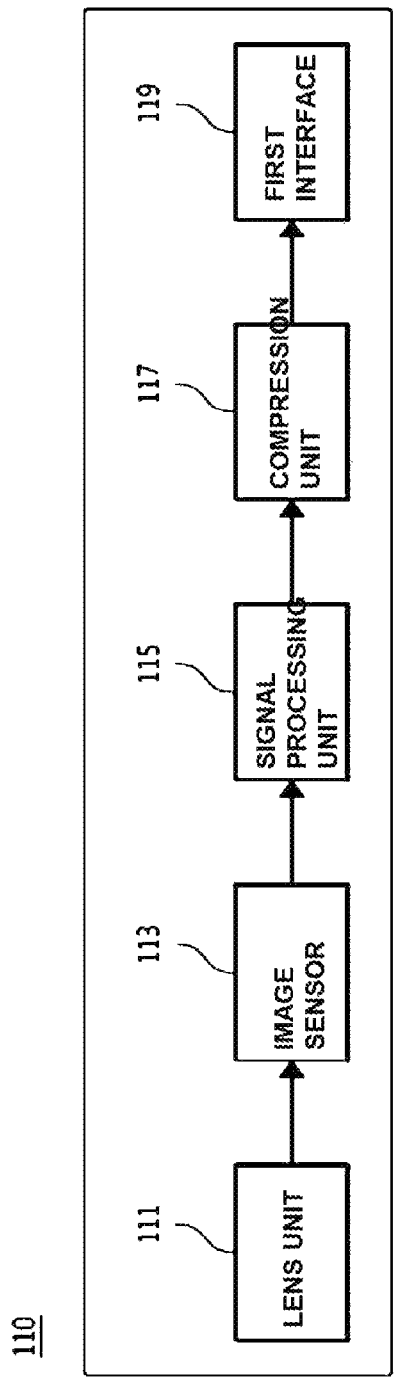
FIG. 2 is a block diagram showing a configuration of a security camera according to an embodiment of the present invention.

FIG. 2 is a block diagram showing a configuration of the security camera according to the embodiment of the present invention.

Referring to FIG. 2, the security camera 110 may include a lens unit 111, an image sensor 113, a signal processing unit 115, a compression unit 117, and a first interface 119.

The lens unit 111 serves to collect light and project an image in front of the lens unit 111 onto the image sensor 113 mounted on the rear of the lens unit 110.

The image sensor 113 converts the image projected from the lens unit 111 into an analog signal, and then converts the analog signal into a digital signal. The image sensor 113 may convert the analog signal into a digital signal such as a low voltage complementary metal oxide semiconductor (LVC-MOS) signal, a low-voltage differential signaling (LVDS) signal, a mobile industry processor interface (MIPI) signal, or the like.

The signal processing unit 115 performs image signal processing on the digital signal converted by the image sensor 113, and then converts the image signal processed digital signal into video format data. The signal processing unit 115 may perform image signal processing, such as auto exposure (AE), autofocus (AF), auto white balance (AWB), or the like, on the digital signal. Further, the signal processing unit 115 may convert the image signal processed digital signal into YUV video format data.

The compression unit 117 compresses the YUV video format data using standards such as Moving Picture Experts Group 4 (MPEG 4), High Efficiency Video Coding (HEVC), H.264, and the like, and then transmits the compressed YUV video format data to the first interface 119.

The first interface 119 is connected to the first communication module 120. The first interface 119 transmits the captured image data compressed by the compression unit 117 to the first communication module 120. The first interface 119 may be an interface for Ethernet communication between the security camera 110 and the first communication module 120. The first interface 119 may be electrically connected to the first communication module 120 through a network cable.

The security camera 110 is described herein as compressing the captured image and then transmitting the compressed captured image to the first communication module 120, but the present invention is not limited thereto, and the first communication module 120 may compress the captured image.

Figure 3:
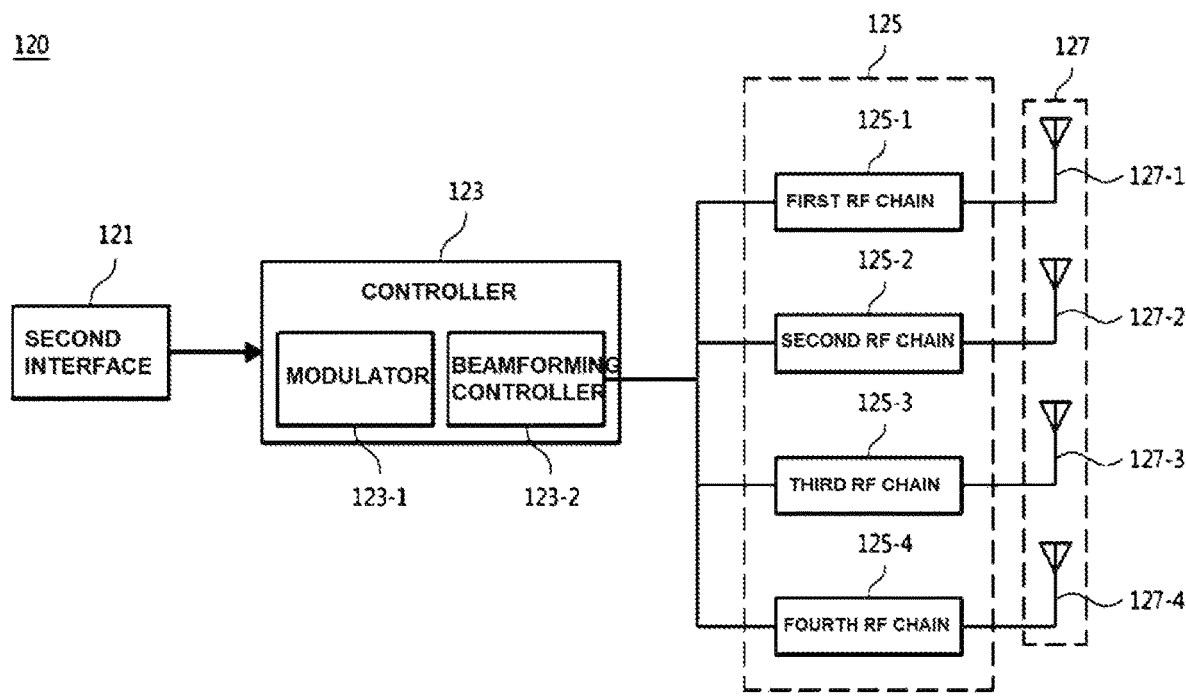
FIG. 3 is a block diagram showing a configuration of a first communication module according to an embodiment of the present invention.

FIG. 3 is a block diagram showing a configuration of the first communication module according to the embodiment of the present invention.

Referring to FIG. 3, the first communication module 120 may include a second interface 121, a controller 123, a plurality of radio frequency (RF) chains 125, and a plurality of antennas 127. Here, the first communication module 120 may be implemented by a combination of software and/or hardware to perform operations described in the specification.

The second interface 121 is connected to the security camera 110. The second interface 121 receives the compressed captured image data from the security camera 110. The second interface 121 may be an interface for Ethernet communication between the security camera 110 and the first communication module 120.

The controller 123 may control each configuration of the first communication module 120 so that the first communication module 120 transmits the captured image data received from the security camera 110 to the reception device 104. The first communication module 120 may include at least one processor and a computer-readable recording medium such as a memory which is accessible by the processor. Here, the processor and the computer-readable recording medium may be provided in the controller 123. The computer-readable recording medium may be inside or outside the processor, and connected to the processor using various known methods. A computer executable instruction may be stored in the computer-readable recording medium. When the instruction stored in the computer-readable recording medium is executed by the processor, the execution may enable the processor to perform the operations described in the specification. For example, an instruction or a set of instructions for modulating the captured image data may be stored in the computer-readable recording medium. Further, an instruction or a set of instructions for performing beamforming may be stored in the computer-readable recording medium.

The controller 123 may include a modulator 123-1 and a beamforming controller 123-2.

The modulator 123-1 may modulate the captured image data transmitted from the second interface 121. In an exemplary embodiment, the modulator 123-1 may modulate the captured image data in a 256 quadrature amplitude modulation (256-QAM) method. That is, the modulator 123-1 may generate a plurality of subcarriers by adjusting the amplitude and the phase of the captured image data using an in-phase carrier and a quadrature-phase carrier. The number of subcarriers may correspond to the number of the plurality of RF chains 125 and antennas 127. However, the modulation method in the present invention is not limited thereto.

The beamforming controller 123-2 may assign the plurality of modulated subcarriers to the plurality of RF chains 125, respectively, and transmit the plurality of modulated subcarriers through the plurality of antennas 127. In this case, the beamforming controller 123-2 may perform beamforming through the plurality of antennas 127 by controlling the plurality of RF chains 125.

Particularly, the beamforming controller 123-2 may perform pairing with the second communication module 120 through the plurality of RF chains 125 and the plurality of antennas 127 so that the first communication module 120 may be communicatively connected to the second communication module 120. In this process, the beamforming controller 123-2 may confirm a direction of the second communication module 120 on the basis of the first communication module 120. Next, the beamforming controller 123-2 may change phases of the subcarriers assigned to the plurality of RF chains 125 such that a direction in which points at which beam patterns transmitted from the plurality of antennas 127 are commonly intersected are connected is directed to the direction of the second communication module 120. Further, the beamforming controller 123-2 may amplify the sizes of the beam patterns transmitted from the plurality of antennas 127.

The RF chains 125 receive the modulated subcarriers from the beamforming controller 123-2. The RF chains 125 may amplify the modulated subcarriers under the control of the beamforming controller 123-2. The RF chains 125 may include a first RF chain 125-1, a second RF chain 125-2, a third RF chain 125-3, and a fourth RF chain 125-4.

Further, the antennas 127 are connected to the RF chains 125, and receive the subcarriers from the RF chains 125 and transmit the received subcarriers to the outside. The antennas 127 may include a first antenna 127-1, a second antenna 127-2, a third antenna 127-3, and a fourth antenna 127-4. The first antenna 127-1 may be electrically connected to the first RF chain 125-1, the second antenna 127-2 may be electrically connected to the second RF chain 125-2, the third antenna 127-3 may be electrically connected to the third RF chain 125-3, and the fourth antenna 127-4 may be electrically connected to the fourth RF chain 125-4.

The first RF chain 125-1 to the fourth RF chain 125-4 and the first antenna 127-1 to the fourth antenna 127-4 may form one communication channel, respectively. Four RF chains 125 and four antennas 127 are shown herein, but the present invention is not limited thereto, and various numbers of RF chains 125 and antennas 127 may be provided.

The first RF chain 125-1 may receive a first subcarrier from the beamforming controller 123-2, amplify the first subcarrier, and transmit the amplified first subcarrier through the first antenna 127-1. The second RF chain 125-2 may receive a second subcarrier from the beamforming controller 123-2, amplify the second subcarrier, and transmit the amplified second subcarrier through the second antenna 127-2. The third RF chain 125-3 may receive a third subcarrier from the beamforming controller 123-2, amplify the third subcarrier, and transmit the amplified third subcarrier through the third antenna 127-3. The fourth RF chain 125-4 may receive a fourth subcarrier from the beamforming controller 123-2, amplify the fourth subcarrier, and transmit the amplified fourth subcarrier through the fourth antenna 127-4. The beamforming controller 123-2 may change the phases of the subcarriers, from the first subcarrier to the fourth subcarrier for beamforming, and then transmit the subcarriers, from the first subcarrier to the fourth subcarrier to the first RF chain 125-1 to the fourth RF chain 125-4, respectively. The first RF chain 125-1 to the fourth RF chain 125-4 may each include an amplifier.

Meanwhile, although the case in which radio waves are transmitted through the RF chains 125 and the antennas 127 is described above, the radio waves may be received through the RF chains 125 and the antennas 127. In this case, the RF chains 125 may receive transmission and reception switching control signals from the controller 123 and perform a function of transmitting or receiving radio waves. For example, the RF chains 125 may receive a transmission switching control signal from the controller 123 and perform a function of transmitting radio waves. Further, the RF chains 125 may receive a reception switching control signal from the controller 123 and perform a function of receiving radio waves.

When the RF chains 125 perform the function of receiving radio waves, the RF chains 125 may filter a signal of the used frequency band (e.g., 5 GHz) from the received radio wave (that is, a wireless signal), amplify the signal, and transmit the amplified signal to the controller 123. To this end, the RF chains, from the first RF chain 125-1 to the fourth RF chain 125-4 may each include a low-noise amplifier (LNA).

Although the configuration of the first communication module 120 is described herein, the second communication module 120 may also have the same or similar configuration. That is, the second communication module 120 may also include four RF chains and four antennas so that the wireless security camera system 100 may be implemented as a 4×4 MIMO system. Further, the second communication module 120 may also be implemented to perform beamforming. For example, the second communication module 120 may include a plurality of antennas for receiving subcarriers transmitted through a plurality of antennas 127. In addition, the second communication module 120 may include a plurality of RF chains which are connected to the plurality of antennas, respectively, and filter the received subcarriers in the used frequency band. Further, the second communication module 120 may include a demodulator, which receives the subcarrier from each of the plurality of RF chains and demodulates the subcarrier into the original captured image.

According to the embodiment of the present invention, the image captured by the security camera 110 is transmitted using an IEEE 802.11ac standard, and thus the captured image may be transmitted in a high frequency bandwidth of 80 MHz at a frequency of 5 GHz. Specifically, it is possible to realize a data transmission rate (a data throughput) of 1 Gbps or more by transmitting the captured image through a MIMO system. For example, in the case of an IEEE 802.11ac standard, data is transmitted at a transmission rate of 433.3 Mbps in a frequency bandwidth of 80 MHz, and thus in a 4×4 MIMO system, a transmission rate of 433.3 Mbps×4=1,733.2 Mbps (maximum 1.7 Gbps) may be realized. In this case, not only a full high definition (FHD) image but also an ultra-high definition (UHD) image may be transmitted in real time.

As described above, the captured image is transmitted by the MIMO function with a frequency bandwidth of 80 MHz using the IEEE 802.11ac standard, and thus it is possible to reduce a phenomenon in which the data transmission is interrupted when the captured image of the security camera 110 is transmitted and also reduce a transmission delay due to multi-pass fading. That is, a delayed signal due to multi-pass fading is detected and corrected by the MIMO function, and thus an image disconnection phenomenon due to information loss may be fixed, thereby ensuring the continuity of monitoring through the security camera 110.

Further, the image captured by the security camera 110 is transmitted by forming a high-output beam pattern using a beamforming method, and thus a data transmission distance may be lengthened, thereby enabling the long distance transmission of the captured image. Here, the first communication module 120 is integrated with the security camera 110 and directly transmits the image captured by the security camera 110 through beamforming, and thus the long distance transmission of the captured image may be performed without a separate relay device (e.g., an access point, a wireless router, or the like).

Further, according to the embodiment of the present invention, the captured image of the security camera 110 may be transmitted outdoors and indoors over a long distance. Further, a plurality of security cameras 110 are connected to the first communication module 120, and thus captured images of the plurality of security cameras 110 may be simultaneously transmitted through the first communication module 120.

Figure 4:
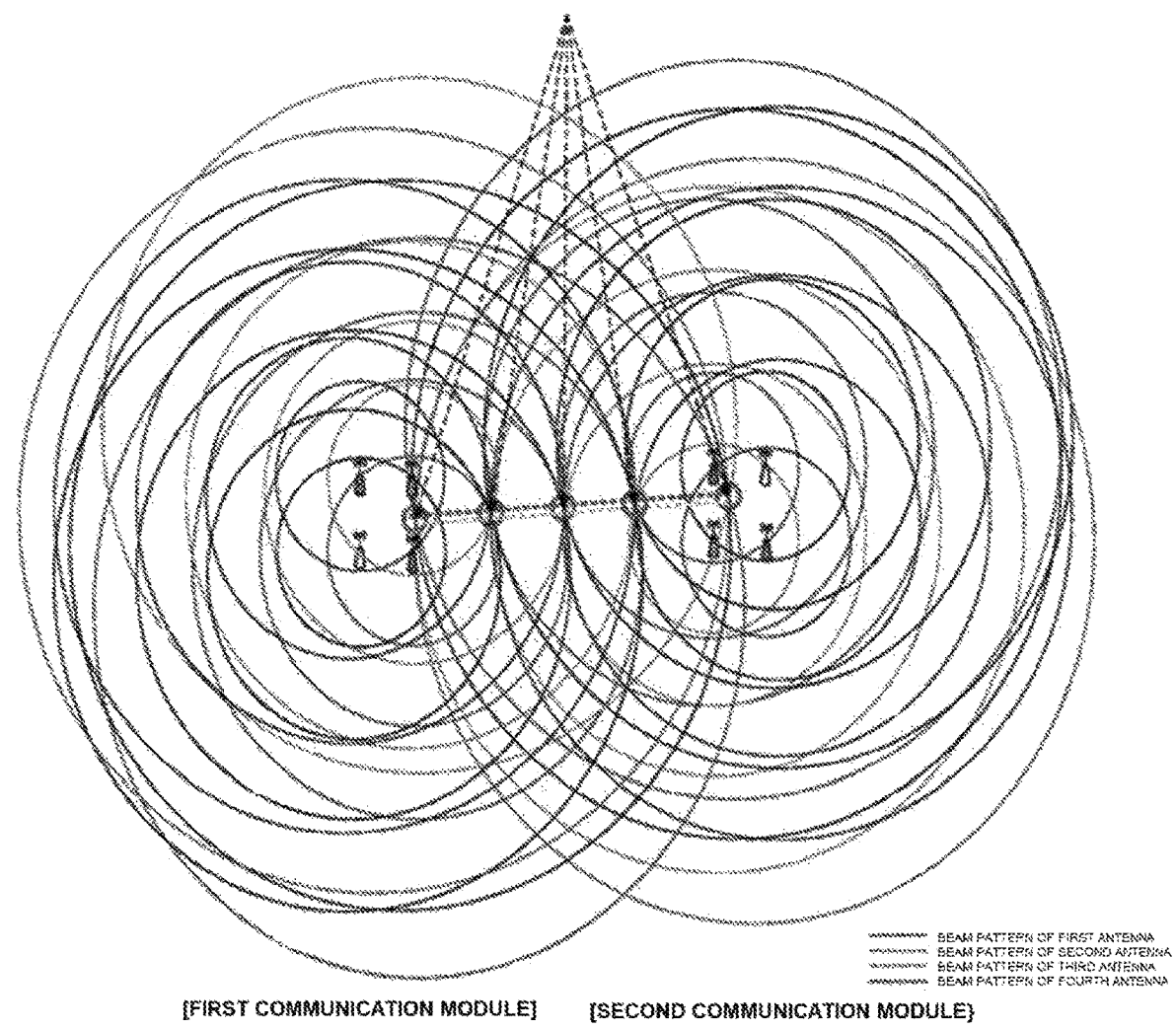
FIG. 4 is a diagram schematically showing a state in which beamforming is performed in a first communication module and a second communication module according to an embodiment of the present invention.

FIG. 4 is a diagram schematically showing a state in which beamforming is performed in a first communication module and a second communication module according to an embodiment of the present invention.

Referring to FIG. 4, the first communication module and the second communication module may be communicatively connected by performing pairing. In this case, a plurality of antennas (shown as four antennas) of the first communication module and a plurality of antennas (shown as four antennas) of the second communication module form predetermined beam patterns, respectively.

A beamforming controller (not shown) of the first communication module confirms a direction in which the second communication module is positioned on the basis of the first communication module. Next, the beamforming controller (not shown) of the first communication module may amplify beam patterns while changing directions of the beam patterns (i.e., changing the phase of the corresponding subcarrier) such that a direction in which points at which the beam patterns of the antennas of the first communication module commonly overlap are connected is directed to the direction of the second communication module.

In the same manner, a beamforming controller (not shown) of the second communication module confirms a direction in which the first communication module is positioned on the basis of the second communication module. Next, the beamforming controller (not shown) of the second communication module may amplify beam patterns while changing directions of the beam patterns (i.e., changing the phase of the corresponding subcarrier) such that a direction in which points at which the beam patterns of the antennas of the second communication module commonly overlap are connected is directed to a direction of the first communication module.

In this case, in the first communication module, the output of the beam patterns may increase toward the direction of the second communication module. In the second communication module, the output of the beam patterns may increase toward the direction of the first communication module. Therefore, the captured images of the security cameras 110 may be transmitted over a long distance.

While the present invention has been described above in detail with reference to representative embodiments, it may be understood by those skilled in the art that the embodiment may be variously modified without departing from the scope of the present invention. Therefore, the scope of the present invention is defined not by the described embodiment but by the appended claims, and encompasses equivalents that fall within the scope of the appended claims.

The invention claimed is:

1. A wireless security camera system, comprising:
a security camera;
a first communication module to receive images captured by the security camera from the security camera and including a plurality of antennas to transmit the received captured images via a wireless network;
a second communication module including a plurality of antennas to receive the captured images transmitted through the plurality of antennas; and
a storage unit to store the captured images received by the second communication module,
wherein the captured images are transmitted and received between the plurality of antennas of the first communication module and the plurality of antennas of the second communication module in a multi-input and multi-output (MIMO) manner;
the first communication module and the second communication module transmit and receive the captured images by performing beamforming on the plurality of antennas in a direction of the other module when transmitting the captured images; and
the first communication module and the second communication module are communicatively connected by performing pairing, confirm the direction of the other module, and change phases of beam patterns of the plurality of antennas such that a direction in which points at which the beam patterns overlap are connected is directed to the direction of the other module.

2. The wireless security camera system of claim 1, wherein the first communication module and the second communication module transmit and receive the captured images of the security camera using an Institute of Electrical and Electronics Engineers (IEEE) 802.11ac standard.

3. The wireless security camera system of claim 1, wherein the first communication module is built in the security camera, and is provided in a manner that the security camera directly transmits the captured images by MIMO and beamforming.

4. The wireless security camera system of claim 1, wherein the second communication module is built in the storage unit.

5. The wireless security camera system of claim 1, wherein the first communication module includes:
an interface connected to the security camera and configured to receive images captured by the security camera;
a modulator to modulate the captured images received by the interface and generate a plurality of subcarriers;
a plurality of first radio frequency (RF) chains to amplify the modulated subcarriers;
a plurality of first antennas respectively connected to the plurality of first RF chains and configured to transmit the subcarriers; and
a beamforming controller to transmit the modulated subcarriers to the plurality of first RF chains and perform beamforming on the plurality of first antennas.

6. The wireless security camera system of claim 5, wherein the second communication module includes:
a plurality of second antennas to receive respectively the subcarriers transmitted by the plurality of first antennas;
a plurality of second RF chains respectively connected to the plurality of second antennas and configured to filter the received subcarriers;
a demodulator to receive the subcarriers from the plurality of second RF chains and demodulate the subcarriers to the captured images; and
an interface connected to the storage unit and configured to transmit the demodulated captured images to the storage unit.

7. A wireless security camera system of comprising:
a security camera;
a first communication module to receive images captured by the security camera from the security camera and including a plurality of antennas to transmit the received captured images via a wireless network;
a second communication module including a plurality of antennas to receive the captured images transmitted through the plurality of antennas; and
a storage unit to store the captured images received by the second communication module,
wherein the captured images are transmitted and received between the plurality of antennas of the first communication module and the plurality of antennas of the second communication module in a multi-input and multi-output (MIMO) manner;
the first communication module and the second communication module transmit and receive the captured images by performing beamforming on the plurality of antennas in a direction of the other module when transmitting the captured images,
wherein the first communication module and the second communication module transmit and receive the captured images of the security camera using an Institute of Electrical and Electronics Engineers (IEEE) 802.11ac standard; and
the first communication module and the second communication module transmit and receive the captured images of the security camera using an N×N MIMO manner (N is a natural number) with a frequency bandwidth of 80 MHz at a frequency of 5 GHz.

8. A communication module, which is a communication module for wirelessly transmitting images captured by a security camera, the communication module comprising:
an interface connected to the security camera and configured to receive images captured by the security camera;
a modulator to modulate the captured images received by the interface and generate a plurality of subcarriers;
a plurality of RF chains to amplify the modulated subcarriers;
a plurality of antennas respectively connected to the plurality of RF chains and configured to transmit the subcarriers to another communication module in a multi-input and multi-output (MIMO) manner; and
a beamforming controller to transmit the modulated subcarriers to the plurality of RF chains and perform beamforming on the plurality of antennas in a direction of another communication module when the respective subcarriers are transmitted, wherein the beamforming controller confirms the direction of another communication module by performing a paring with another communication module, and changes phases of beam patterns of the plurality of antennas such that a direction in which points at which the beam patterns are intersected are connected is directed to the direction of another communication module.

9. The communication module of claim 8, wherein the communication module transmits the captured images of the security camera to another communication module using an Institute of Electrical and Electronics Engineers (IEEE) 802.11ac standard.

10. The communication module of claim 9, wherein the communication module transmits the captured images of the security camera to another communication module using an N×N MIMO manner (N is a natural number) with a frequency bandwidth of 80 MHz at a frequency of 5 GHz.

11. The communication module of claim 8, wherein the communication module is built in the security camera, and is provided in a manner that the security camera directly transmits the captured images by MIMO and beamforming.

12. The communication module of claim 8, wherein the RF chains receive a transmission switching control signal or a reception switching control signal from the beamforming controller of the communication module, and amplify the modulated subcarriers and transmit the amplified modulated subcarriers through the antennas when receiving the transmission switching control signal from the beamforming controller.

13. The communication module of claim 8, wherein the RF chains receive a transmission switching control signal or a reception switching control signal from the beamforming controller of the communication module, and filter radio waves received through the antennas and transmit the filtered radio waves to the beamforming controller when receiving the reception switching control signal from the beamforming controller.

* * * * *